United States Patent
Shelton et al.

(10) Patent No.: US 10,828,664 B2
(45) Date of Patent: Nov. 10, 2020

(54) DEVICE AND METHOD FOR MAKING SHEAR-ALIGNED, SOLVENT-CAST FILMS

(71) Applicants: Cameron Shelton, Bear, DE (US); Thomas H. Epps, III, Bear, DE (US)

(72) Inventors: Cameron Shelton, Bear, DE (US); Thomas H. Epps, III, Bear, DE (US)

(73) Assignee: UNIVERSITY OF DELAWARE, Newark, DE (US)

(*) Notice: Subject to any disclaimer, the term of this patent is extended or adjusted under 35 U.S.C. 154(b) by 64 days.

(21) Appl. No.: 15/776,289

(22) PCT Filed: Dec. 8, 2016

(86) PCT No.: PCT/US2016/065600
§ 371 (c)(1),
(2) Date: May 15, 2018

(87) PCT Pub. No.: WO2017/100438
PCT Pub. Date: Jun. 15, 2017

(65) Prior Publication Data
US 2018/0326451 A1    Nov. 15, 2018

Related U.S. Application Data

(60) Provisional application No. 62/264,986, filed on Dec. 9, 2015.

(51) Int. Cl.
*B05D 1/42* (2006.01)
*B05C 11/04* (2006.01)
*G02B 5/30* (2006.01)

(52) U.S. Cl.
CPC .............. *B05D 1/42* (2013.01); *B05C 11/045* (2013.01); *B05D 2252/02* (2013.01); *G02B 5/30* (2013.01)

(58) Field of Classification Search
CPC .............................. B05D 1/42; B05D 2252/02
See application file for complete search history.

(56) References Cited

U.S. PATENT DOCUMENTS 5,044,305 A * 9/1991 Shibata .................. B05C 5/005
                                                       118/126
5,156,682 A    10/1992 Zimmer
(Continued)

FOREIGN PATENT DOCUMENTS

WO    2006007745 A1    1/2006

OTHER PUBLICATIONS

International Search Report and Written Opinion for International Application No. PCT/US2016/065600, dated Feb. 8, 2017—8 pages.
(Continued)

*Primary Examiner* — Dah-Wei D. Yuan
*Assistant Examiner* — Kristen A Dagenais-Englehart
(74) *Attorney, Agent, or Firm* — RatnerPrestia (57) ABSTRACT

A coating head includes a coating device and at least a first flexible blade that is capable of being shaped into contact with a solvent-containing film on a substrate upon pressing the first flexible blade against the film, thereby providing contact between the blade and the film over a contact distance when the coating head is drawn over the substrate. The coating device and the blade are separated by a spacing distance such that partial loss of solvent occurs from a starting film formed on the substrate by the coating device as the coating head is drawn over the substrate, the partial solvent loss forming the solvent-containing film. A method of producing a film having a hierarchical structure includes drawing a coating head across a substrate to form on the substrate via the coating device a starting film including a solvent and a material for forming the hierarchical structure.

5 Claims, 5 Drawing Sheets (56) References Cited

U.S. PATENT DOCUMENTS

| | | | | |
|---|---|---|---|---|
| 6,262,788 B1 * | 7/2001 | Hanrahan | ............... | C09K 19/38 |
| | | | | 349/117 |
| 2006/0040069 A1 * | 2/2006 | Lavretovich | ......... | C09K 19/606 |
| | | | | 428/1.2 |
| 2011/0017949 A1 * | 1/2011 | Golovin | ................ | C09K 19/02 |
| | | | | 252/299.01 |
| 2011/0038045 A1 * | 2/2011 | Zhou | .................... | G02B 5/3083 |
| | | | | 359/485.01 |
| 2014/0227507 A1 | 8/2014 | Brophy et al. | | |

OTHER PUBLICATIONS

Ming Luo et al., "Writing Highly Ordered Macroscopic Patterns in Cylindrical Block Polymer Thin Films via Raster Solvent Vapor Annealing and Soft Shear"; ACS Macro Letters, Apr. 20, 2015, vol. 4, pp. 516-520.

\* cited by examiner

DEVICE AND METHOD FOR MAKING SHEAR-ALIGNED, SOLVENT-CAST FILMS

CROSS REFERENCE TO RELATED APPLICATIONS

This application claims priority benefit of a national stage application under 35 U.S.C. 371 of International Application No. PCT/US2016/065600, titled "Device and Method For Making Shear-Aligned, Solvent-Cast Films", filed Dec. 8, 2016, which claims priority to U.S. Provisional Patent Application No. 62/264,986, filed the Dec. 9, 2015, the entireties of which are incorporated herein by reference for all purposes.

STATEMENT REGARDING FEDERALLY SPONSORED RESEARCH

This invention was made with support from the U.S. Government under NSF Grant No. DMR-1207041 awarded by National Science Foundation and NIST Grant No. 70NANB12H239 awarded by NIST Center for Neutron Research. The U.S. Government has certain rights in the inventions recited herein.

BACKGROUND OF THE INVENTION

A broad range of industrial and biomedical materials applications require the preparation of films in which nanostructures and/or macromolecules are organized into a hierarchical structure. In many cases, such films are cast from solvents and then the hierarchical structure is produced by application of shear, which aligns and orients the structures or molecules. Examples of materials that may be oriented in this way include polymers, polymer blends, block (co) polymers, nanocomposites, fibers, biological materials, proteins, nanoparticles, nanotubes, and nanowires.

For example, block copolymers (BCPs) comprise two or more chemically distinct polymer 'blocks' that are covalently bound together, in which thermodynamic repulsion caused by polymer-polymer incompatibility between the bound blocks can result in microphase separation into distinct morphologies such as spheres, cylinders, networks, lamellae, and perforated lamellae. When confined to thin film geometries, BCPs can be used for applications such as nanolithographic masks, nanotemplates, nanoporous membranes, sensors, surface modifiers (e.g., hydrophobic or oleophobic surface), optical materials, anti-reflection coatings, battery electrolyte membranes, electrodes, capacitors, triboelectric generators, and optoelectronic devices (e.g., organic solar cells), provided that the morphological domains are highly ordered and aligned. The alignment of structures in a BCP thin film can be achieved by applying shear forces from a polydimethylsiloxane (PDMS) pad adhered to the film, using either "hard" or "soft" shear orientation techniques. "Hard" shear is typically applied by lateral displacement of the PDMS pad on a BCP film heated above the glass transition and/or melting temperature(s) of the component blocks but below the order-disorder transition temperature, while "soft" shear can be applied by swelling/deswelling of PDMS pads exposed to solvent vapor on solvent-swollen films, which have reduced glass transition temperatures and increased chain mobility due to the incorporation of solvent. However, both of these techniques require film casting and shear-based alignment/orientation to be two separate steps. Film casting can usually be performed at a relatively high speed, but hard and soft shear orientation over even small length scales (mm-cm) typically takes minutes to hours, making large-scale production difficult. Therefore, methods of speeding up the shear-orienting process for block copolymers and other hierarchical materials would be a welcome advance.

SUMMARY OF THE INVENTION

The invention provides a coating head including a coating device and at least a first flexible blade in a fixed but optionally adjustable position relative thereto, wherein the first flexible blade is capable of being shaped into contact with a solvent-containing film on a substrate upon pressing the first flexible blade against the solvent-containing film, thereby providing contact between the first flexible blade and the solvent-containing film over a contact distance when the coating head is drawn over the substrate;

wherein the coating device and the first flexible blade are separated by a spacing distance such that partial loss of solvent occurs from a starting film formed on the substrate by the coating device as the coating head is drawn over the substrate, the partial solvent loss forming the solvent-containing film.

The invention also provides a method of producing a film having a hierarchical structure, including 1) drawing a coating head according to any preceding claim across a substrate to form on the substrate via the coating device a starting film including a solvent and a material for forming the hierarchical structure, and 2) pressing the first flexible blade against a solvent-containing film that is formed by partial solvent loss from the starting film, thereby shaping the first flexible blade to provide contact between it and the solvent-containing film over a contact distance.

DETAILED DESCRIPTION OF THE INVENTION

As used herein, the term "solvent" refers to a material for dissolving or suspending a block copolymer or other material for casting into a film, and which evaporates during subsequent processing to form the desired film having a hierarchical structure. For example, the solvent may be water, an organic solvent, or any combination thereof. Exemplary organic solvents include toluene, any one or more of the three xylene isomers (ortho, meta, or para), and tetrahydrofuran (THF). Exemplary hierarchical structures made using the coating heads and methods of the invention can be made from materials such as polymers, polymer blends, block (co)polymers, nanocomposites, fibers, biological materials, proteins, nanoparticles, nanotubes, and nanowires.

The inventors now disclose a coating head that casts films and directionally aligns nanostructures or microstructures within hierarchical materials. The head contains a coating device, which may be a casting blade, gravure coater, or spray head, and at least one shear-alignment blade that is positioned at a fixed but preferably adjustable distance from the coating device. If more than one shear-alignment blade is used, each such blade is positioned inline at a different fixed but preferably adjustable distance from the coating device. The coating head can be installed in a casting solution well and incorporated into a moving substrate/blade system (e.g., roll casting, flow coating, dip coating, blade coating, etc.). If a casting blade is used, it will normally be rigid. The shear-alignment blade is normally flexible. The coating head allows continuous formation of a film by moving the head across the substrate or by moving the substrate under the head. The casting solution is metered and spread onto a substrate via the rigid blade and then structures in the film are shear-aligned (or otherwise oriented) via the flexible blade(s) during drying (i.e., solvent loss/removal, such as by evaporation). The substrate is typically in the form of a sheet, film, or web. It may be flexible or rigid. Nonlimiting examples include glass sheets and silicon wafers.

The flexible blade(s) is/are bent downwards, in direct contact with the film surface to impart a shear force that aligns structures. Because the shear force is applied while the film is drying (and still contains an appreciable concentration of solvent), the material has the necessary mobility to reorder in the film before kinetic trapping of the morphology occurs. Thus, the coating head combines the displacement shear force of hard shear techniques with the glass transition temperature reduction (and increased polymer chain mobility) effect used in soft shear techniques by including, in a single coating head, a flexible blade along with a traditional coating device, for example a rigid coating or metering blade. The coating head provides a continuous route to film formation that is amenable to high-throughput roll-to-roll processing of hierarchical materials.

The coating head can simultaneously cast and align block copolymer thin film nanostructures in a continuous manner. Compared with current shear-alignment technologies, the combination of "hard" and "soft" shear components increases the speed at which shear forces can align the film, often by as much as 2-4 orders of magnitude, without causing film damage. The aligned nanostructures can be produced for use in advanced nanotechnology applications requiring highly-ordered nanostructures. Dimensions of 5 nanometers to several hundred nanometers are typical, but the invention is not limited to that range.

For example, in the case of aligning block copolymers, for example poly(styrene-b-isoprene-b-styrene) ("SIS") triblock copolymers, the large time scales (approximately 30 min) associated with aligning nanostructures with PDMS via displacement (hard shear) or swelling/deswelling (soft shear) shear forces would appear incompatible with the fast casting speeds (1-20 mm/s) associated with blade coating, using traditional methods. However, by incorporating a flexible PDMS blade at an appropriate distance behind a coating device, for example a glass casting blade, the inventors have demonstrated that BCP films can be cast from slow-evaporating solvents with a high degree of order and directional alignment in a one-step, continuous process.

Figure 1A:
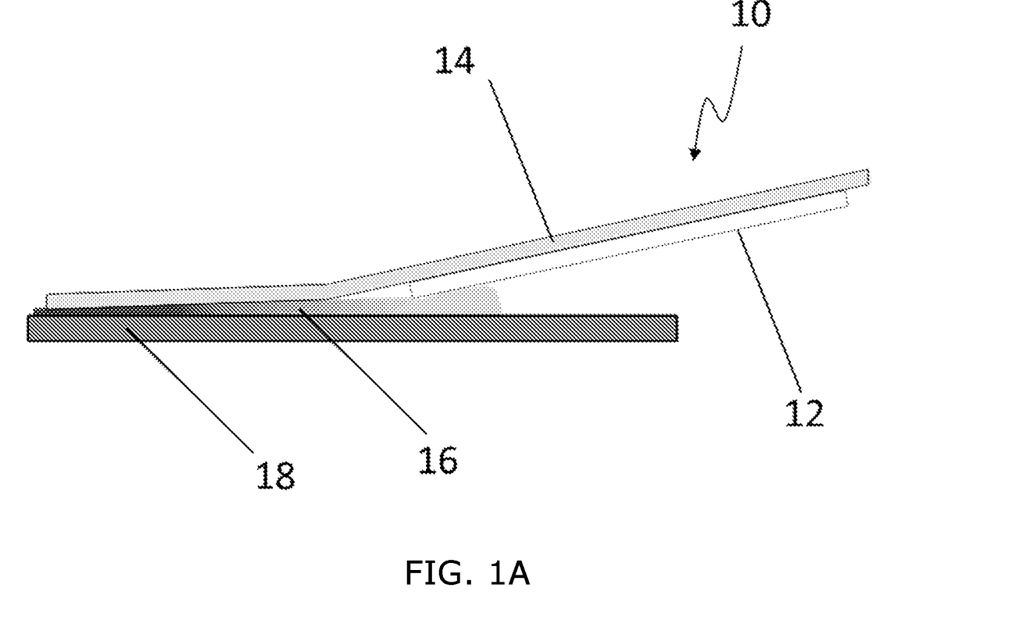
FIG. 1A is a schematic view of an exemplary coating head according to the invention, applying and aligning a coating on a substrate.

FIG. 1A shows a schematic view of an exemplary coating head according to the invention, shown generally at 10, applying a layer of a mixture 16 containing a solvent and a material that will form the hierarchical structure, for example a polymer, to a substrate 18, which may be of any suitable material, for example a silicon wafer, optionally with a surface layer of silica. The coating head includes a rigid blade 12 that spreads and meters the mixture to a desired thickness, using traditional coating techniques in which either the substrate 18 is moved to the left or the coating head 10 is moved to the right. The rigid blade 12 can be made of any sufficiently rigid material, for example metals, glasses, ceramics, and organic and inorganic polymers. Alternatively, the rigid blade 12 may be replaced by another type of coating device, for example a spray head or gravure coater.

The flexible blade 14 is shown as having uniform thickness, but it may be tapered or have spatial gradients/differentiations in surface chemistry and/or modulus. It may be smooth or patterned. Nonlimiting examples of patterns include patterns of dimples or bumps, or patterns of raised lines and/or channels, which may run transversely, or in the direction of draw, or diagonally.

The length, thickness, elastic modulus, hydrophobicity or hydrophilicity, and other material properties typically will be optimized for any given system, depending on the type of hierarchical material to be aligned and the solvent system used for the process. The flexible blade may be made from any of a variety of materials, including for example flexible metals, acrylics, natural or synthetic rubbers, fibers (or fiber mats), fluoropolymers, elastomers (including thermoplastic elastomers), depending on the desired film composition. Specific examples include functionalized or non-functionalized elastomeric polymers selected from the group consisting of natural rubber, polyisoprenes, polybutadienes, polychloroprenes, polysiloxanes, fluorosilicones, and fluoroelastomers. In the case of a PDMS polymer, the elastic modulus can be increased by increasing the crosslink density. Similar considerations apply to whatever other material may be chosen to make the flexible blade.

Typically, the flexible blade 14 will have combination(s) of length, thickness, and elastic modulus such that the blade exerts sufficient pressure on the drying film over some or all of a contact distance of the blade with the film, sufficient to result in alignment. In FIG. 1, the flexible blade 14 is flat in its natural state but is bent or shaped as shown by pressing against the layer of the mixture 16, thus providing an aligning shear force during the relative motion of the blade and the mixture. Alternatively, or in addition, pressure can be provided or increased by applying an external force, for example by placing a weight (not shown) on the flexible blade 14 over at least a portion of the area that contacts the layer of mixture 16. In any case, the force is sufficient to align the material, for example a polymer, into a hierarchical structure. The weight can be supplied by adding solvent on or to the flexible blade 14.

The distance between the coating device and any subsequent flexible blades may be adjustable. The force used for pressing the first flexible blade against the solvent-containing film may be adjustable. If the coating device is a rigid casting blade, the tilt of the blade relative to the surface of the substrate may be adjustable. The tilt of first flexible blade relative to the surface of the substrate, prior to pressing the first flexible blade against the solvent-containing film, may be adjustable.

The flexible blade moves (drags) across the cast film at a fixed but preferably adjustable distance from the rigid blade, with the distance controlling how much solvent evaporates between the rigid and flexible blades and therefore how much is still present in the film during shear-alignment. When there is an optimal amount of solvent remaining in the film, the shear imparted by the flexible blade effects directional alignment. Appropriate amounts of solvent are those that reduce the glass transition temperature to below the ambient temperature or change an otherwise crystalline or semi-crystalline material to an amorphous state, thus providing the material with enough molecular mobility to restructure and align, yet the film is still dry enough to avoid being spread by the flexible blade or otherwise damaged. Depending on the composition of the solvent/material mixture, the amount of solvent in the film during shear-alignment can be controlled by adjusting the distance between the flexible and rigid blades, as well as the relative velocities at which the blades move over the surface. The distance between the rigid blade and the location where first (if more than one) flexible blade begins contact with the film will typically be at least 0.5 cm, or at least 1, 1.5, 2, 2.5, or 3 cm. The distance will typically be at most 50 cm, or at most 40, 30, 20, or 10 cm. The amount of solvent in the film as it first contacts the flexible blade will typically be at least 1 wt %, or at least 2, 3, 4, 5, 6, 7, 8, 9, or 10 wt %. It will typically be at most 30 wt %, or at most 25, 20, or 15 wt %.

The flexible blade (or each such blade, if more than one is used) contacts the film for a distance sufficient to align the material into a hierarchical form. The required contact distance varies considerably, depending on the solvent and the material from which the film is made. In typical cases, the contact distance will be at least 2 cm, or at least 3, 4, 5, 6, 7, 8, 9, or 10 cm. It will typically be at most 30 cm, or at most 20 or 10 cm.

More than one flexible blade may be used to improve the alignment, create multidirectional alignment, and/or control which sections of the film are aligned. For example, flexible blades with patterned areas (e.g., channels, dots, etc.), different thicknesses (or gradient thicknesses), or variable moduli (stiffness) may be used.

Typically, films made with a coating head according to the invention will be suitably aligned as of the time they pass out of contact with the flexible blade(s), but they may optionally be subsequently annealed to improve the alignment by heating to a temperature above the glass transition temperature and below the order-disorder transition temperature. Furthermore, solvent vapor and magnetic/electric fields can be used to improve the alignment.

Figure 1B:
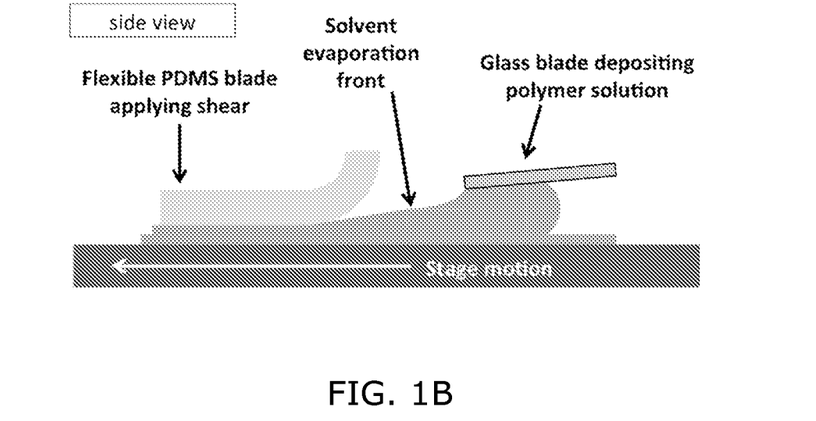
FIG. 1B is a schematic view of another exemplary coating head according to the invention, applying and aligning a coating on a substrate.

The action by which the coating head is drawn across the substrate can be such that the coating head moves, the substrate moves, or both the coating head and substrate move, but at different relative speeds. FIG. 18 shows another exemplary coating head according to the invention, applying and aligning a coating on a substrate carried by a stage.

Figure 2:
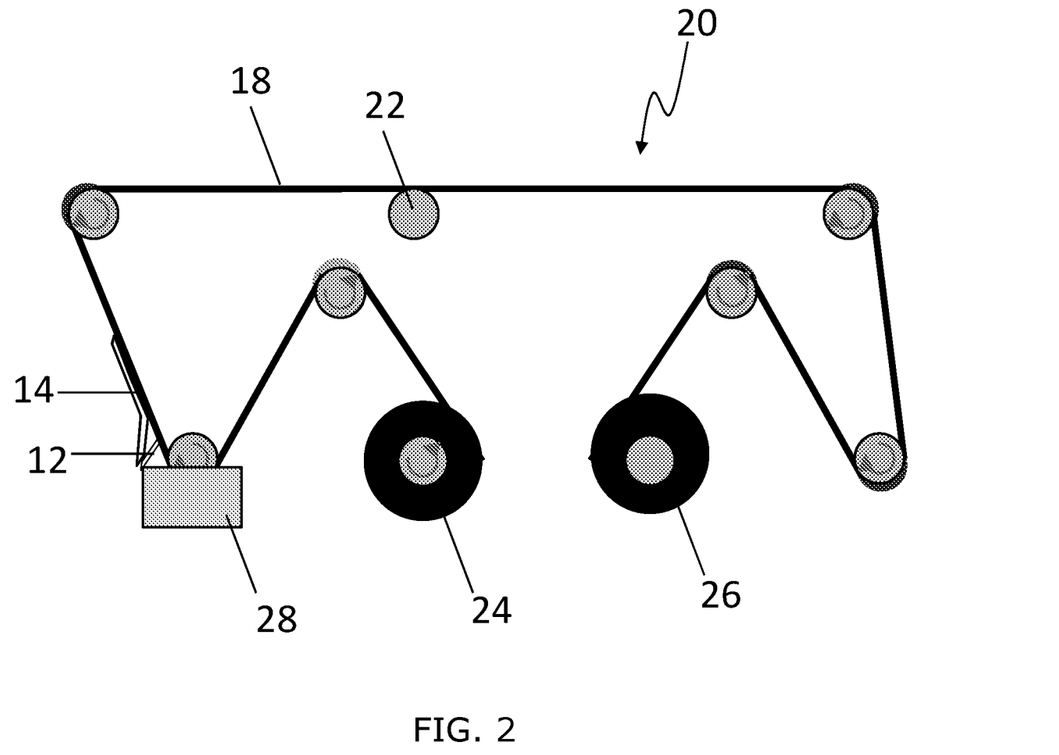
FIG. 2 is a schematic view of an exemplary coating system employing a coating head according to the invention.

FIG. 2 is a schematic view of a coating system, shown generally at 20, employing a coating head similar to the one shown in FIG. 1, but in which the rigid blade 12 and the flexible blade 14 are mounted farther apart and at an angle with respect to each other. Take-up reel 26 draws substrate 18 along rollers 22 through a reservoir 28 containing the film-forming mixture, which is metered by the rigid blade 12 and aligned by the flexible blade 14. In this embodiment, substrate 18 is a flexible web made of any suitable flexible material, for example a PDMS sheet.

Applications of Shear-Aligned Films

Potential applications that may benefit from the invention are those that require nanoscale (5-100 nm) features with highly aligned domains. For example, BCP thin films made with a coating head according to the invention are ideally suited for nanolithography, nanotemplating, optical waveguides, optoelectronic devices, patterned media, biological arrays, and organic solar cells. Because the inventive technique allows a high volume, roll-to-roll method to direct alignment, the industrial feasibility of incorporating BCP thin films in the production of these applications improves greatly. The coating head and approach can be applied to a variety of polymer architectures (e.g., diblock, triblock, multiblock, star block, brush, bottle brush, polymer blend, polymer/dopant), polymer properties (e.g., glassy-glassy, glassy-rubbery, high/low Tg, high/low $\chi$, crystalline/non-crystalline), and polymer morphologies (e.g., spheres, lamellae, cylinders, perforated lamellae, and networks).

The inventive coating head and method are desirable for areas of interest and applications including, but not limited to, nanotechnology, nanolithographic masks, nanotemplating, nanoporous membranes, optical waveguides, optoelectronic devices, patterned media, biological arrays, organic solar cells, energy transportation and storage, water purification, gas separations, insulation, mechanical durability, medicine, clothing, optical coatings, computer processors, radiation shielding, surface coatings, contact lenses, wearable electronics, lubricants, hydrophobic coatings, hydrophilic coatings, oleophobic coatings, cookwear coatings, sensors, analytical instruments, heating/cooling devices, microfluidic devices, aerospace parts, nylons, chemical processing, naval equipment, automotive technology, wireless communication, memory storage, biological implants, actuators, pace makers, window coverings, cell phones, music devices, pH sensors, and polymer grafting.

Possible additional applications for the inventive coating head are plentiful as it is amenable to widely used industrial processing techniques. Additionally, the shear used to align structures in the film can be adjusted to align both hard (e.g., fibers, nanoparticles, nanotubes) and soft (e.g., polymers, biological materials, proteins) materials. Other areas of interest and potential application are included, but not limited to, energy transportation, battery and fuel cell parts, medical stents, cosmetics, personal health and beauty, food storage and processing, pharmaceuticals, housing, fiber production, bulletproof vests, aircraft equipment and parts, medical equipment casing, skin grafts, optical coatings, electronic casings, sporting equipment, self-healing materials, clothing, lubricants, biomedical devices, electronic coatings, microdots, protective gear, Kevlar production, abrasion-resistant materials, heat shields, harsh weather/environment electronics, liquid films, and polarization, liquid-crystal polymers, musical equipment/instruments, thermal properties, mechanical tuning, electrical conductivity, fiber optics, nanowires, and plumbing.

EXAMPLES

The inventors have tested the inventive coating head using a cylinder-forming poly(styrene-b-isoprene-b-styrene) ("SIS") BCP thin films as a comparison to their earlier work using soft shear alignment mechanisms, as reported in in Luo, M.; Scott, D. M.; Epps, T. H., III *ACS Macro Lett.* 2015, 4, 516-520. SIS films cast/aligned from toluene and o-xylene at different velocities showed highly-aligned nanostructures in the direction over which the PDMS blade was drawn.

Figure 3:
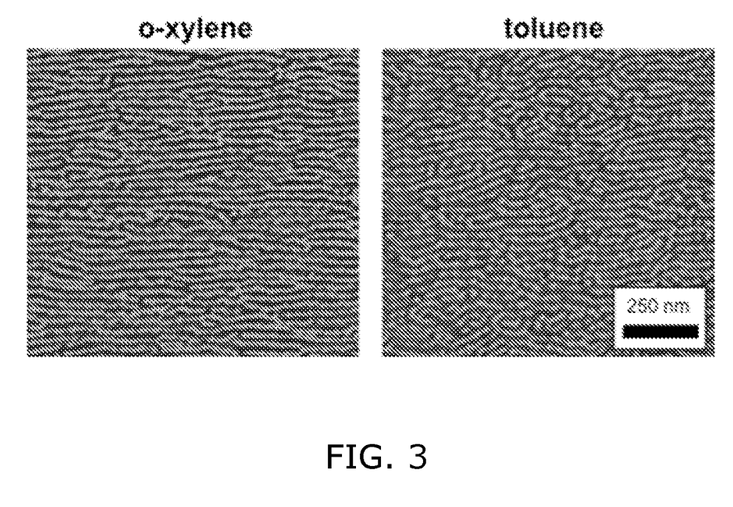
FIG. 3 shows atomic force microscopy images of shear-aligned cylindrical nanostructures in a 100 nm poly(styrene-b-isoprene-b-styrene) ("SIS") film produced with a coating head according to the invention.

FIG. 3 shows atomic force microscopy (AFM) images of shear-aligned cylindrical nanostructures in 100 nm SIS films produced while simultaneously casting the film. The films were cast from o-xylene and toluene solutions at the same rigid-to-flexible blade distance at speed of 2 mm/s and 4 mm/s, respectively. The o-xylene solution was cast at a lower speed because the solvent dries slower than toluene. However, the slower evaporation makes shearing the optimal film solvent content more controllable than faster drying solvents.

Figure 4:
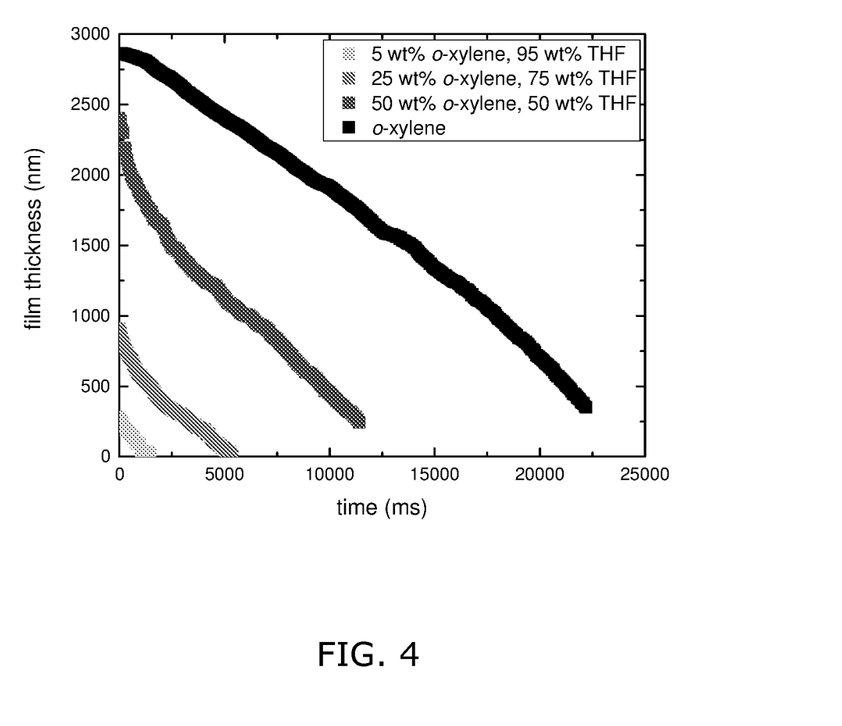
FIG. 4 shows drying curves for SIS copolymer films cast from of THF/o-xylene mixtures of varying proportions.

FIG. 4 shows drying curves for SIS copolymer films cast from of THF/o-xylene mixtures of varying proportions, showing how the solvent content can be controlled during film alignment. The solvent content during shear alignment can be tuned to improve ordering and reduce film damage.

Figure 5:
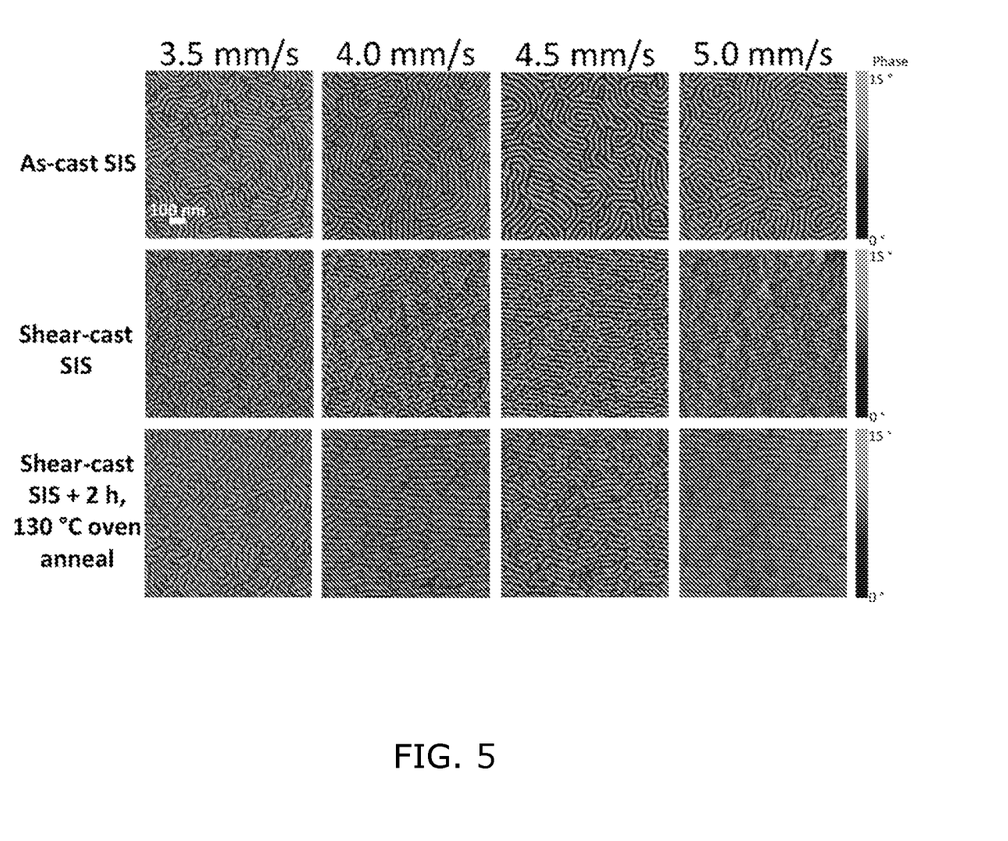
FIG. 5 shows atomic force microscopy images of cylindrical nanostructures in approximately 100 nm SIS films made by traditional methods (top row) and with a coating head according to the invention (middle and bottom rows).

FIG. 5 shows AFM micrographs of blade-cast 100 nm SIS films containing cylindrical nanostructures under various conditions with and without shear-alignment from the flexible blade. All employed casting from 5% o-xylene, 95% THF, which the inventors found to provide better alignment than pure o-xylene under these conditions. The top row shows structures produced by casting the SIS film as a control. The middle row samples were prepared at the speeds shown by casting and aligning the film according to the invention, using a coating blade of the sort shown schematically in FIG. 1. The bottom row samples were prepared as in the middle row, but with addition of a post-shear thermal annealing step, which helped reduce defect densities and improve ordering.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A method of producing a film having a hierarchical structure, comprising
    (a) providing a coating head comprising a rigid coating device and at least one flexible blade disposed at a spacing distance from the rigid coating device and in a fixed but optionally adjustable position relative to the rigid coating device;
    (b) drawing the coating head relative to a substrate at a selected velocity to form on the substrate via the rigid coating device a starting film consisting of a solvent and a material for forming the hierarchical structure, and
    (c) contacting at least a portion of a surface of the at least one flexible blade against a solvent-containing film formed by partial solvent loss from the starting film, thereby providing an aligning shear force over a contact distance across the solvent-containing film sufficient to impart directional alignment of nanostructures or microstructures within the solvent-containing film,
    wherein the material is a block copolymer and
    wherein the coating head simultaneously casts, using the rigid coating device, and aligns, using the at least one flexible blade, nanostructures or microstructures in the solvent-containing film in a continuous manner.

2. The method according to claim 1, wherein the block copolymer is a poly(styrene-b-isoprene-b-styrene) (SIS) block copolymer.

3. The method according to claim 1, further comprising annealing the solvent-containing film after step (c).

4. The method of claim 1, further comprising selecting the velocity of the coating head relative to the substrate and the spacing distance between the coating device and the at least one flexible blade to optimize an amount of solvent remaining in the solvent-containing film during application of the aligning shear force.

5. The method of claim 4, wherein the amount of solvent remaining is operative to reduce a glass transition temperature of the solvent-containing film below an ambient temperature or to change an otherwise crystalline or semi-crystalline material in the solvent-containing film to an amorphous state.

* * * * *